Jan. 24, 1956

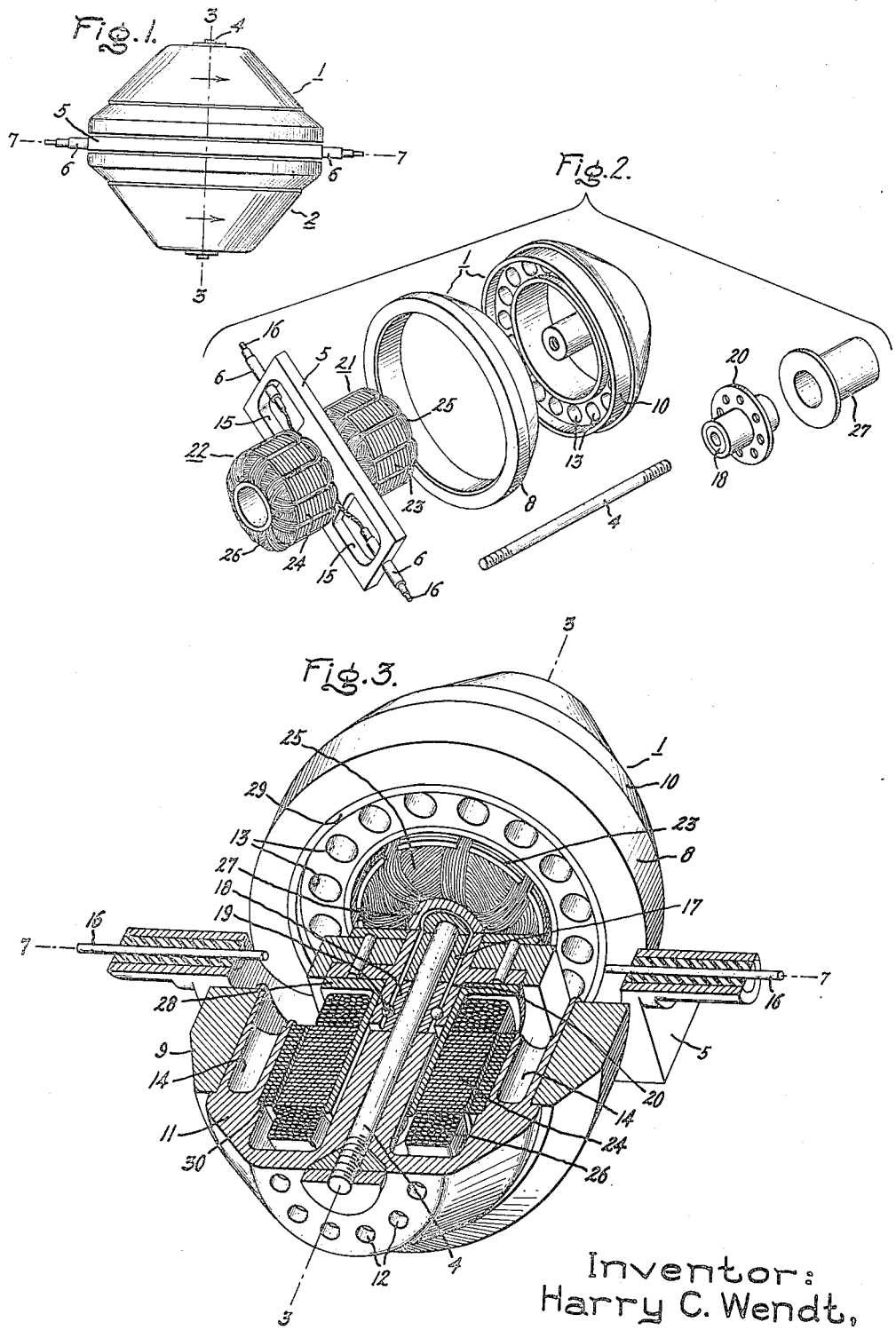

H. C. WENDT 2,731,836

SYMMETRICAL GYROSCOPE

Filed Dec. 12, 1952

Inventor:
Harry C. Wendt,
by Richard E. Healy
His Attorney.

Jan. 24, 1956

H. C. WENDT 2,731,836

SYMMETRICAL GYROSCOPE

Filed Dec. 12, 1952

Inventor:
Harry C. Wendt,
by Richard E. Hosley
His Attorney.

United States Patent Office 2,731,836
Patented Jan. 24, 1956

2,731,836

SYMMETRICAL GYROSCOPE

Harry C. Wendt, Saugus, Mass., assignor to General Electric Company, a corporation of New York Application December 12, 1952, Serial No. 325,577

18 Claims. (Cl. 74—5.7)

The present invention relates to gyroscopes, and more particularly to the construction of gyroscopes having novel and improved gyro rotor structures.

In the heretofore conventional gyroscope, the rapidly spinning rotor and its motive means have been supported in a surrounding gimbal, this assembly comprising a rotor structure which is in turn pivotally supported and which tends to preserve an alignment in space by virtue of the gyroscopic inertia developed with high-speed rotation of the relatively heavy rotor. Those versed in the art appreciate that the errors and difficulties which attend the construction and operation of gyroscopes are numerous and that even the highest degree of care and skill in manufacture does not suffice to remedy many of the factors impairing instrument accuracy or to insure precision operation. Gyroscope errors are principally evidenced as a consequence of the unique effects known as precession, i. e., pivotal movement or attempted pivotal movement of the gyroscope spin axis, and its supporting assembly, perpendicular to the direction of any torque producing force transmitted to the spin axis. Such forces productive of precession may originate in any of the gyro bearings, or in high inertias of parts other than the rotor, in unbalances of parts having dimensional changes with temperature fluctuations, in windage effects or in variations of bearing friction and alignment due to wear or improper lubrication or changing load under the influence of external accelerations. Present and foreseen practical manufacturing techniques have not offered prospects of sufficiently minimizing these errors to justify expectation of much improved performance of mass-produced gyroscopes on that basis alone. Also, when reductions are made in the weight of the gyro rotor, to lessen the load upon rotor and gimbal bearings, and thus to decrease friction, there are accompanying detrimental reductions in gyroscopic inertia; and compensatory increases in such inertia produced by increases in rotor speed introduce further frictional effects and decrease intolerably the useful bearing life.

According to the instant invention, the foregoing disadvantages are very greatly minimized in a most simple and entirely unorthodox gyroscope arrangement characterized by a rotor structure comprising a symmetrical rotor assembly and a pivoting arrangement which eliminates the conventional rotor structure gimbal. The construction preferably employs complete symmetry of both the electrical rotor motive means and rotor, and concentrates those stationary masses which do not produce true gyro inertia at the centermost position within the rotor structure while locating the rotor mass outermost, where the highest gyro inertia commensurate with relatively small mass and low speed of rotation can be developed. As a result of the complete symmetry obtained by the present teaching, windage forces, and dimensional changes in the rotor structure with temperature variations, are substantially ineffective to occasion unbalancing. Further, greater gyroscopic inertias are inherently obtainable with the gyro rotor of this invention than with rotors of equal mass and speed of rotation in other rotor structures having the same outermost dimensions, because the need for the usual gyro rotor structure gimbal is obviated and the rotor itself may be made of greater diameter to fit within the same outer dimensions as other rotor structures. This feature of course makes possible the development of higher gyroscopic inertias with a small-size rotor structure than was obtainable with prior rotor structures of the same small size. As will appear more fully hereinafter, simple, highly accurate, and rugged constructional features are also present.

Accordingly, it is one of the objects of the instant invention to provide a gyroscope having a novel and improved rotor structure.

Second, it is an object to provide a gyroscope having a rotor structure with an improved ratio of gyroscopic inertia to weight.

Further, an object of this invention is to provide a gyroscope wherein the need for a conventional rotor gimbal is obviated.

Further, it is an object to provide a gyroscope having a symmetrical rotor structure which preserves balance despite temperature-induced dimensional variations and changes in windage forces.

Additionally, it is an object to provide a high-accuracy gyroscope having a simple and rugged rotor structure of novel construction affording improved gyroscopic inertias and minimized effect of inertias of stationary components of the structure.

By way of summary of but one aspect of this invention, I provide a gyroscopic rotor structure, for pivotal suspension in one or more gyro gimbals, which comprise two hollow and substantially cup-shaped rotor halves mounted in a spaced-apart axial relationship on a common central shaft such that their open ends are approximately disposed and separated only by a small gap. A flat bar or plate is positioned in the gap between the rotor halves, and separated therefrom, and supports a central outer bearing raceway concentric with the rotor shaft, the shaft itself supporting the inner raceway for the bearing structure, which structure also includes bearing balls. On each side of this bar or plate there is also supported one of two identical electrical hysteresis motor stators, projecting into the corresponding cup-shaped rotor half and cooperating magnetically with a surrounding annular hysteresis rotor element set into the interior of the rotor half. Bearing trunnions extend from opposite sides of the bar and plate to the supporting gimbal in which the rotor structure is pivotally suspended, with motor excitation leads running through these trunnions.

Although the features of this invention which are believed to be novel are set forth in the appended claims, the details of the invention itself and further objects and advantages thereof may be readily comprehended by reference to the following description taken in connection with the accompanying drawings, wherein:

Fig. 1 is a pictorial view of a gyro rotor structure constructed in accordance with the teachings of this invention;

Fig. 2 is a partly-exploded pictorial illustration of a portion of a rotor structure such as that of Fig. 1;

Fig. 3 is a partly cut-away view of a rotor structure such as that shown in Figs. 1 and 2;

Figure 8:
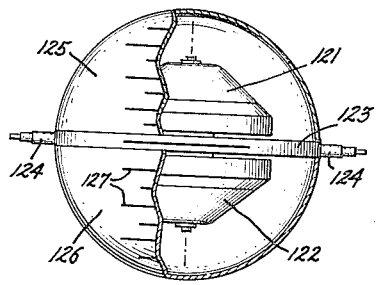

Fig. 8 discloses an enclosed gyro rotor structure assembled in accordance with this invention.

Referring to the pictorial representation of one of my gyro rotor structures, in Fig. 1, it should be observed that the rotor comprises two collinear spaced-apart rotor halves, 1 and 2, of like dimensions and configurations, which are rapidly spun in the same angular direction around the spin axis 3—3 by motive means not illustrated. The ends of rotor shaft 4, to which the rotor halves are attached, are visible in this drawing. Rotor shaft 4 is rotatable in bearings supported by the thin flat bar or plate 5 positioned between and separated from the oppositely-disposed rotor halves. Trunnions 6 on each side of the bar 5 permit a rotatable mounting of the entire rotor structure about the axis 7—7 perpendicular to the spin axis 3—3.

It is important to note that, as distinguished from the conventional gyroscope, the rotor structure gimbal or frame has been eliminated in the foregoing assembly and complete mechanical symmetry has been obtained. In accordance with heretofore customary practice, the gyro rotor or gyro rotors have been mounted for rotation about the spin axis on a shaft supported in an outer frame or gimbal entirely encircling the rotor. That rotor frame or gimbal has always necessarily been of a relatively massive and heavy construction to withstand the loads impressed upon it by the gyroscope, to resist dimensional variations with temperature, to preserve an accurate alignment of the minor axis pivots, and to maintain a fixed position of the rotor shaft. The conventional rotor frame or gimbal not only has undesired weight, from the standpoint of detrimentally increased loading of support bearings and attending increased bearing frictions, but this "dead weight" has also been distributed beyond the outer surfaces of the rotor, where its adverse inertia effects are most strongly exerted and most destructive of gyro accuracy. Further, assembly of the rotor structure has been a complicated process due to the difficulties of accurately fitting the rotor and motive means within the frame, and the minor axis pivots into the frame. It is obvious, too, that the space consumed by the rotor gimbal has either limited the size which the gyro rotor may assume in a gyroscope of any given outer dimensions, or has increased the outer dimensions of a gyroscope beyond what they would be in a unit not requiring a rotor gimbal.

By way of contrast with prior gyro rotor structures having the preceding disadvantages and limitations, the arrangement of Fig. 1 is found to possess no surrounding gimbal or frame. Pivotal support of the rotor structure is achieved through a flat plate or bar 5 which mounts the rotor shaft 4 for its rotation about the spin axis. Plate 5 is preferably of rectangular outer configuration, though not necessarily, and may be made light in weight, extremely rigid, insensitive to unbalance by temperature-induced dimensional changes or by changes in windage effects, very simple to fabricate, and small in size. The inherent rigid property of a bar or plate such as that illustrated as 5 in the drawings affords a far more stable support for the rotor structure and a more accurate alignment of pivots 6 than could be achieved with the usual ring or hollow frame type of support. In addition to being small, the "dead" weight of the support 5 is concentrated near the innermost portions of the gyroscope where its inertia is rendered of the least possible effect. With a support bar or plate 5 dimensioned as illustrated, only the small trunnions of the supporting element extend beyond the greatest radius of the rotor, and the overall size of the entire rotor structure is, accordingly, at an absolute minimum.

Greater detail of a preferred structure, such as that of Fig. 1, is revealed in Figs. 2 and 3, wherein the former depicts certain parts in an "exploded" relationship, and wherein the latter shows an oblique view of the assembled structure with one-quarter cut away to expose the interior. For convenience and simplicity of description, those portions of the structure of Figs. 2 and 3 which are substantially the same as those of Fig. 1 are identified by like reference characters. Each of the identical rotor halves 1 and 2 is preferably fabricated of two parts: one of which, 8 in the case of rotor half 1, and 9 in the case of rotor half 2, is an annular member of a weighty material suitable for producing a large gyro inertia, such as a tungsten alloy, shrunk onto a relatively light-weight umbrella-shaped element, 10 in the case of rotor half 1, and 11 in the case of rotor half 2. This construction, which is a preferred one though not essential, affords a desirably high ratio of inertia to weight for the rotor structure, thereby minimizing the bearing friction in the gyro support. Rotor elements 10 and 11 may be cooled through vent holes, such as 12 on element 11, and may be further reduced in weight while preserving the rugged strength by the formation of holes 13 and 14, respectively.

Support bar 5 is shown to have two openings 15 therein, this construction being advantageous not only in accomplishing a further reduction of unwanted weight and inertia, but also in permitting electrical connections to be brought to two of the electrical power leads 16, which are concentric with trunnions 6 and insulated therefrom. Bar 5 provides a support for the rotor halves 1 and 2 which are coupled for rotation with the spin axis shaft 4. A central hollow cylindrical spacer 17 on shaft 4 separates two inner-raceway bearing members 18 firmly attached to shaft 4, and bearing balls 19 enable a low-friction rotation of the rotor shaft in support 5 by rolling between the inner raceways 18 and the common stationary outer raceway 20 riveted to the support 5. The motive means for the rotors comprises two hysteresis motors, one associated with each rotor half. Motor stators 21 and 22 for rotor halves 1 and 2, respectively, comprise stator lamination stacks 23 and 24 with stator windings 25 and 26 about these lamination stacks. Flanged tubular members 27 and 28, mounted upon the outer raceway 20, support stators 21 and 22, respectively, such that they are concentric with and spaced from the rotor shaft 4 and are suspended in the recesses or hollow interiors of rotor halves 1 and 2. Annular rotor laminations 29 and 30 for the "inside-out" hysteresis motor are rigidly held within the rotor elements 10 and 11, respectively, and impart the spin to the rotor halves.

Further advantages of my invention appear from the foregoing disclosures. One is the fact that the so-called "figure of merit," that is, the ratio of gyro inertia to weight of the rotor structure, is much improved beyond those values obtainable with the usual rotor gimbal arrangement. Even with the support bar 5 cut away to have the illustrated openings, this support is of the utmost rigidity and simple machineability, and, since the thickness is very small, its mass shift by creepage is only a minute fraction of that which is present in the conventional large encompassing gimbal. The construction is also of particular merit in that the rotors spin with a rotation of the inner raceway of the rotor shaft bearings. Motor bearing life is thus much improved over that of a bearing wherein the outer raceway revolves, the fatigue life of the latter bearing arrangement being only ⅓ and the lubrication life, due to the lubricants being thrown off the bearing balls, being only ⅛ of such lives in the improved arrangement in which the inner raceway rotates. Exact symmetry of my structure is also a most advantageous characteristic, inasmuch as temperature-responsive dimensional changes of parts of both halves of the structure are the same and no errors may be introduced by unbalance effects. The windage forces on both rotor halves being the same, balance is maintained so accurately that wind shrouds, normally essential in known gyros, need not be used.

It should be understood that the present rotor structure represents an unconventional and highly advantageous solution to the problem of vastly improving gyro accuracies without reducing the useful life of such instruments and without so complicating their manufacture that mass production would be physically impossible or economically impractical. Near-sonic flight speeds and above have imposed the most rigorous standards of accuracies upon aircraft gyro instruments employed either as visual references or automatic control devices, because even minute errors may result in large or disastrous deviations from a desired flight path. Additionally, in the case of directional gyroscopes, slaving of the gyro with the earth's magnetic field becomes impossible during flights in polar regions, and it is essential that the gyro drift from a desired heading not exceed a few degrees per hour at most during those intervals when slaving cannot be utilized. Such factors as these have necessitated development of gyroscopes having accuracies heretofore considered beyond realization through the application of known techniques. As was briefly stated earlier herein, a larger useful gyro inertia may be produced conventionally by increasing rotor speed, which then raises windage errors and adversely increases rotor bearing friction to cause drift and to shorten bearing life, or by increasing the mass of the gyro rotor, which has the same attendant disadvantages as well as the further one of increasing friction in other support bearings the frictions of which contribute to gyro drift. Also, the weights and inertias of parts not directly generating gyro inertia may be reduced by employing lighter materials and smaller dimensions, although such an approach inevitably leads to weakened structure and misalignments of bearing pivots. Flotation of gimbals and rotor structure, and the highest precision manufacturing techniques, are further possible avenues to decreased friction and greater gyro accuracies, but only at the sacrifice of greater skill, time and expense. In accordance with the present invention, however, this seeming impasse has been removed through the unique approach of constructing the rotor with two symmetrical halves, eliminating the rotor gimbal, and substituting for the gimbal a pivotal support means intermediate the rotor halves.

Figure 4:
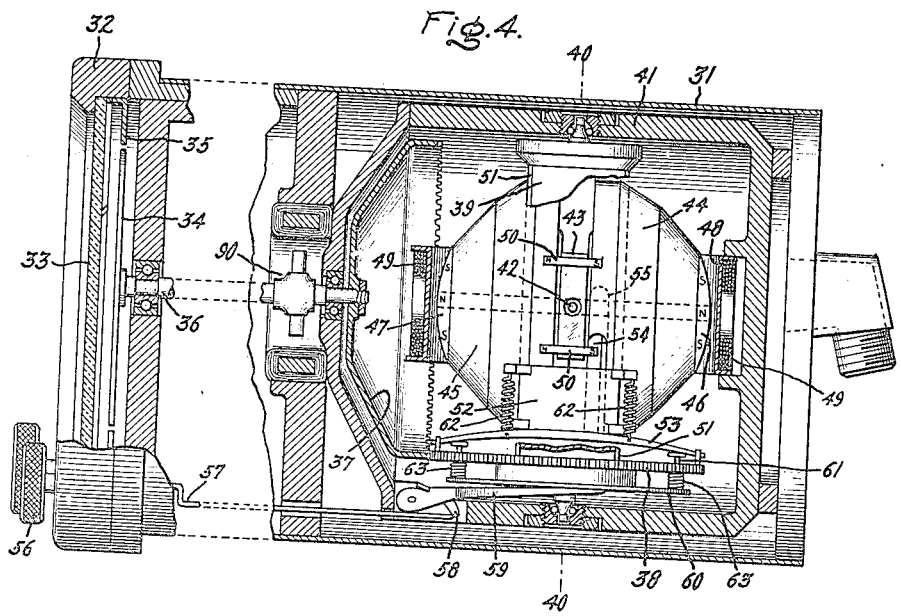
Fig. 4 illustrates a directional gyroscope arrangement of the invention.

In its embodiment in a directional gyroscope as shown in Fig. 4, this rotor structure is particularly beneficial in additional respects, notably in affording improved leveling and caging. That instrument is illustrated as comprising the usual outer housing 31, joined with a front flange 32 containing a window 33 through which the dial 34 may be viewed and compared with the index plate 35. Output shaft 36 actuates dial 34 in accordance with the angular orientations of cup-gear 37 meshed with and driven by gear 38 which is attached to the main gimbal 39 pivoted about the normally vertical major axis 40—40 in the outer frame 41. The rotor structure is pivotally mounted in main gimbal 39 about the horizontal axis 42 which is perpendicular to both the normally horizontal spin axis and the normally vertical major axis 40—40. As in the embodiment described previously, the rotor structure includes a rotor support bar 43 and two symmetrical rotor halves, 44 and 45, which are caused to spin by motive means such as the hysteresis motors of Figs. 2 and 3. For purposes of leveling the gyro rotor spin axis, that is, precessing the gyro rotor structure to a position wherein the spin axis is normal to both the major and minor pivot axis, the arrangement employed is similar to that disclosed in Patent 2,585,693, issued February 12, 1952, and assigned to the same assignee as that of the present invention. The torques required for the leveling precession are produced by the interreaction between permanent magnet materials 46 and 47 rotating with the gyro rotor and a conducting ring 48 which is coaxial with the major gyro axis and symmetrically positioned in relation to the rotor spin axis when the latter is level. Were a conventional rotor gimbal employed, the rotating permanent magnets would have to be positioned outside the gimbal, with the rotor shaft extending through the gimbal to impart the rotation, such that a maximum and undistorted magnetic field from the magnets might interact with the eddy-current fields set up in the conducting ring. As is well known, this interaction is effective to precess the rotor structure to a leveled position when it has departed from level, but does not impose unbalanced torques when leveling is accomplished and the magnets spin in a symmetrical relationship to the conducting ring. However, my rotor structure wherein the usual gimbal is eliminated is eminently suited for spinning magnetic material in proximity with the conducting leveling ring without requiring extension of the rotor shaft through a gimbal or the positioning of magnetic materials beyond the outer limits of the rotor structure. For this purpose, end portions 46 and 47, or merely one of these, are properly shaped and constructed of material permanently magnetized in the prescribed manner, such as is set forth in the aforesaid patent. These end portions are part of the rotor structure itself, of course, and rotate accordingly.

Controlled precessions about the major axis 40—40 may be accomplished by interaction between the magnetic fields produced by torque motor winding 49 and permanent magnets 50 mounted on the support bar 43. Magnetic fields established by the precession magnets 50 and the precession coils 49 are in approximately a perpendicular relation when the latter are energized, whereby a torque is exerted upon the rotor structure tending to rotate it about the minor axis. In accordance with the well known laws of gyroscopic precession, this torque in turn causes precession of the gyro about the major axis, in a direction dependent upon the direction of the precession coil flux and the direction of rotor rotation. Precession in the desired sense is achieved by appropriately energizing coils 49; for example, the energizing control may be applied from a system slaving the gyro with a magnetic compass or flux valve responsive to the earth's magnetic field.

Normally, caging of the directional gyroscope about the minor axis is realized by engaging a shaped part on the rotor frame or gimbal with a part supported in the outer frame of the gyroscope. In one practice of this invention, with the usual rotor gimbal absent, the support bar 43 in Fig. 4 may itself comprise one of the caging elements. By way of illustration, the main gimbal 39 is shown to be provided with side channels 51 in which a caging slide 52 inside the gimbal 39 may be slidably elevated to a caged position from a lower position in which it rests upon a lowered caging yoke 53 pivoted on main gimbal gear 38. Caging slide 52 carries an upwardly-projecting caging finger 54 which is disposed slightly to one side of the minor axis and on the inner side of the slide, and which, when it is fully elevated to the caged position, provides a vertical flat caging surface immediately adjacent one side of the flat support bar 43. Dashed lines 55 illustrate the caged position of finger 54, and it is readily observed that bar 43 is then restrained from pivotal movement and is held in the desired caged position. This arrangement necessitates limited projection of the bar 43 outwardly beyond the limits of rotor halves 44 and 45.

Caging finger 54 may have a channel formed therein to avoid interference with magnets 50, as is shown. Although main gimbal 39 is largely cut-away in the drawing, it will be appreciated that the main body of slide 52 is on the inside of the gimbal, that magnets 50 are next in inward position, and that the caging surfaces of finger 54 bar 43 engage innermost near the rotor halves. Caging is initiated by pressing knob 56 inwardly, whereupon sliding member 57, movable with the knob, presses against trigger 58 and urges yoke arms 59 upwardly against the circular plate 60 which may be raised and lowered relative to main gear 38. Elevation of plate 60 also results in raising of its attached pins 61, these in turn pushing caging yoke 53 and its resiliently coupled caging slide 52 to the elevated caged position. Upon release of knob 56, the sliding member 57 is immediately drawn back by a spring not illustrated, and springs 62 and 63 quickly return the other parts to their uncaged positions. Figure 4 pictures an intermediate step in the caging process, with caging yoke 53, slide 52 and finger 54 partly elevated. If preferred, the bar 43 may be shaped as a cam or have a projecting caging pin, and cooperate with appropriate caging mechanisms such as disclosed, for example, in the above-mentioned patent or in the copending application of Uses et al., Serial No. 272,614, filed February 20, 1952, Patent No. 2,636,389, issued April 28, 1953, and also assigned to the same assignee.

Figure 5:
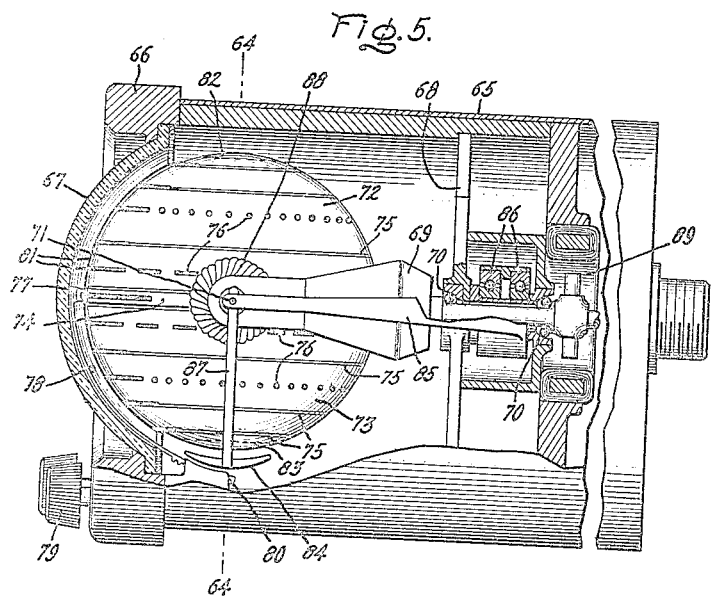
Fig. 5 depicts a gyro vertical arrangement of the invention.

Another embodiment of my invention is illustrated in Fig. 5, wherein there is shown a gyroscope having a normally vertical spin axis 64—64, such devices being identified in the art as gyro verticals, gyro horizons or artificial horizons. An outer casing 65 is attached to the usual front flange 66, in which a partly spherical window 67 is positioned to permit observation of bank and dive-and-climb indications. Within the casing, bracket 68 supports the yoke-shaped main gimbal 69 in bearings 70 for rotation about a normally horizontal major axis. The rotor structure of the gyroscope, which is substantially the same as those earlier described herein, is supported in main gimbal 69 about pivot axis 71, this minor axis being perpendicular to the major axis and also normally horizontal. It will be observed that this rotor structure is substantially spherical, and that the intended configuration results from the substantially hemispherical contour of each of the rotor halves 72 and 73, and the substantially circular shaping of the support plate 74. Ball or sphere type horizon or vertical gyroscopes have commonly been constructed with the rotor frame surrounded by a spherical or partly spherical indicator having graduated indicia thereon, and it has also been known to provide discontinuous indicia markings upon a member rotating with the gyro rotor, for the purposes and in the manner disclosed in my Patent No. 2,535,003, issued on December 19, 1950, and assigned to the same assignee as that of the present invention. By providing the rotor halves 72 and 73 with like hemispherical contours, their outer surfaces themselves constitute desired indicia-bearing surfaces of the instrument. Solid-line graduations 75, or discontinuous-marking graduations 76, or any combination of these applied to the surfaces register dive-and-climb indications when compared visually with a miniature airplane or other stationary index 77 mounted with the outer frame of the instrument. Index 77 is shown to be adjustable with movements of its curved support 78 which is positioned, for example, by knob 79 through a rack and pinion structure not illustrated in full, the rack being formed upon the lower portion 80 of support 78 and the pinion being rotatable with knob 79. Circular support plate 74 may also carry one or more graduations. Or, plate 74 may mount one or two sets of fixed graduation members 81 and may also support the dive-and-climb angle figures which would not be readable if placed upon the spinning rotor halves themselves. In these instances, there is no need for graduations upon the rotor halves, although coloring of the rotor halves provides a desired background for the fixed indicia, and discontinuous markings are desirable to evidence failure of rotor spin. In addition to affording improved markings, each of my rotor halves 72 and 73, or one of them alone, provide one cooperating element of the erecting system for the gyro vertical. For this purpose, the end portions 82 and 83 of rotor halves 72 and 73 are made either of electrically conducting or permanent magnet material. The one of the end portions which is lowermost, such as 83 in Fig. 5 wherein the rotor structure is without gimbal stops and is universally free in its suspension, cooperates with the erecting member 84 pendulously supported in the conventional two-degree-of-freedom bail assembly comprising a first bail 85 pivoted about the major axis in bearings 86 and a second depending bail 87 pivoted in bail 85 about a second axis perpendicular to the major axis. Erecting member 84 is constructed of conducting material if the rotor end portions are permanently magnetized, and, conversely, the member 84 is constructed of permanently magnetized material if the rotor end portions are selected to be of conducting material. With either structure, the eddy currents set up in the conducting material by the permanent magnet fields create fields which interact with the permanent magnet fields to exert torques tending to erect the rotor structure whenever it departs from the vertical. It should be apparent, therefore, that my invention is valuable in obviating the need for sphere-type indicators or backgrounds, or rotor spin indicators, or parts of the usual erecting system, or any grouping of these, in vertical spin axis gyroscopes. Control or remote indicator pick-offs 88 and 89 in Fig. 5, and 90 in Fig. 4, are representative of the conventional electrical devices which are customarily associated with such gyroscopic instruments.

Figure 6:
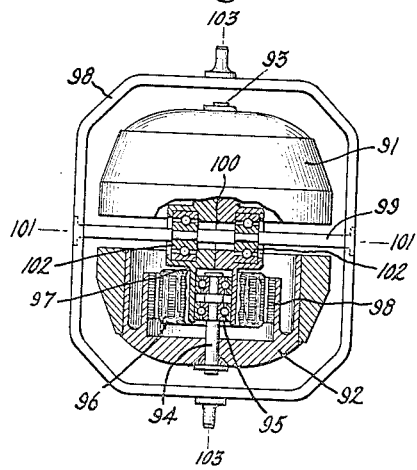
Fig. 6 represents a unique gyro suspension and rotor structure construction.

It is not essential that the two rotor halves of my rotor structure be interconnected by a rotor shaft. Figure 6 depicts such rotor halves, 91 and 92, which rotate independently with rotor shafts 93 and 94, respectively, which are unconnected. Some variations in the speeds of the two rotor halves occasioned by the use of different motor units are not objectionable. Rotor half 92 has been shown in a sectional view to expose the shaft 94, its support bearings 95, the motor stator 96 affixed to the stationary outer raceway and stator mounting 97, and the rotor laminations 98. Rotor half 91 is of like construction. Pivotal support of the rotor structure of Figure 6 is somewhat different from those supports considered earlier herein, inasmuch as there is no bar or plate which provides for the pivotal support. Instead, the θ-shaped main gimbal 98 has a through cross-member 99, rigidly fastened to or integral with the remainder of the gimbal, and that cross-member carries minor-axis bearing surfaces. Stator mountings 97 and 100 are pivotally supported upon cross-member 99 along minor axis 101—101 through bearings 102 which have their inner raceways attached to the cross-member 99. For ease of assembly, stator mountings 97 and 100 are preferably constructed of like halves which may be fixed together about the rotor shafts 93 and 94 and about the minor axis bearings 102, and the main gimbal cross-member 99 is likewise preferably made in two halves which may be fitted into each side of main gimbal 98 and joined in the middle between abutments which confine the inner raceways of minor axis bearings 102 to a centralized position. Slip rings or spirals, not shown, conduct current for the motor stators and may be conveniently located to communicate between the main gimbal 98 or cross-member 99 and the motor stators. Although Figure 6 illustrates the rotor spin axis in alignment with the major axis 103—103, this is simply to facilitate the representation of the structure, the normal position of the spin axis being perpendicular to the major axis. The embodiment in this figure, which may be either that of a directional, vertical or other type of gyroscope, accomplishes a further reduction of "dead weight" of the rotor structure and further concentrates weight of that type toward the center of the gyroscope, where its undesired inertia effects are minimized. The gimballess character of my rotor structure is particularly evident in this unit.

Figure 7:
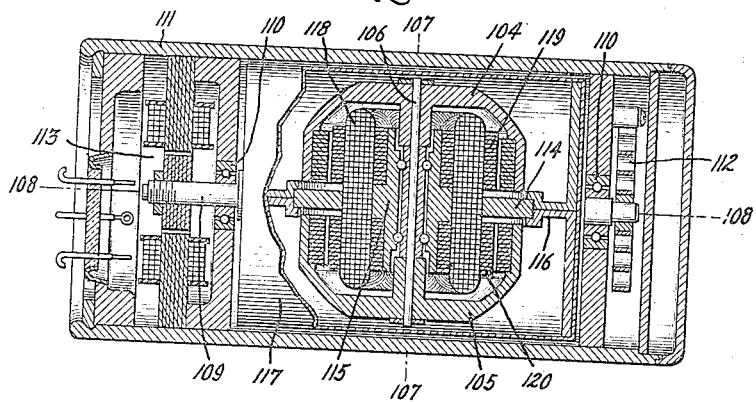
Fig. 7 is a single-axis gyroscope embodiment.

Features which render the instant invention important in the two axes of freedom gyroscope are present in the single axis or rate gyroscope pictured in Figure 7. As is well known, such instruments comprise a rotor structure, usually possessing the standard frame or gimbal, having its axis of spin perpendicular to the single support axis, about which latter axis there is resilient restraint to angular motion. Turning movements of the instrument about an axis perpendicular to the spin and support axes results in a precession about the support axis, the magnitudes and senses of angular deflections against the resilient restraint being proportional to the rates of such angular movements and in directions related to the directions of such movements. Accordingly, the rotor halves 104 and 105 in Figure 7 are adapted to spin with rotor shaft 106 about spin axis 107—107 perpendicular to the support axis 108—108, the shaft 109 for support about the latter axis being mounted in bearings 110 held in the outer casing 111 and the shaft 109 further being angularly restrained by spring 112 coupled thereto and with outer casing 111. Pick-off 113 translates angular deflections of shaft 109 into characteristic electrical signals. Rotor halves 104 and 105 are shown to be supported by a circular support plate 114 which has a central hub portion 115 wherein the rotor shaft bearings are positioned. This plate is in turn clamped in brackets 116 and the entire rotor structure and its bracket are enclosed within a fluid-tight container 117 such that the buoyant effect of fluid filling the spaces between the container 117 and outer casing 111 reduces the loading and friction of bearings 110 to a minute value. In an application of this nature, the circular support plate 114 is particularly well adapted to accurate and rigid mounting throughout its entire circumference. The motor construction in this unit, which may be employed in the other embodiments as well, is further unique in the respect that there is but a single stator winding 118, for both stator lamination stacks 119 and 120. Manufacture of the stator winding is not only thus greatly facilitated, but greater symmetry of construction and more uniform distribution of winding weight is realized, and the stators occupy considerably less space and may have their "dead weight" more centrally located because of the elimination of inner end turns from the stator windings. Reduced overall length of the rotor structure is accomplished with this arrangement of parts, also.

Circular support plate construction in my rotor structure is also of decided advantage where the rotor structure is hermetically sealed, or is surrounded by a wind shroud, or is surrounded in whole or part by a spherical-contour member carrying indicia thereon. Fig. 8 represents that arrangement, the rotor halves 121 and 122 being mounted for rotation in the circular support plate 123 having the minor axes pivots 124 extending from diametrically opposite positions. Hemispherical members 125 and 126 are supported one on each side of the support plate 123, and may carry indicia 127. Alternatively, these members may be sealed with the plate 123 to provide a fluid-tight enclosure for flotation purposes, or for the purpose of keeping the rotor structure hermetically sealed against moisture or foreign particles, or sealed to contain an atmosphere of an inert gas such as helium.

Although preferred embodiments of this invention have been described in detail, it will occur to those skilled in the art that various modifications and substitutions may be employed to realize improved gyroscopes in accordance with the teachings of the present invention. By way of example, my symmetrical rotor and motive means may include an induction or other motor rather than the hysteresis motor described. Further, it is not essential that the motor be of the illustrated inside-out construction, but the rotor element of each of the two symmetrical motors may be coupled to its rotor half such that the stator is outside and substantially surrounds the motor rotor element. Also, in an arrangement such as that of Fig. 4, the directional gyro leveling system may be somewhat reversed, that is, the permanently magnetized end portions of the rotor may be replaced by electrically conducting material and the surrounding leveling ring may be replaced by windings energized to produce the magnetic field required to interact with the rotor end portions and thereby accomplish leveling. For precessing of my gyroscope, such as that of Fig. 4, the use of precessing magnets attached to the rotor support bar may be avoided by constructing the rotor shaft of permanent magnet material, so that it will interact with the torque motor windings to create the desired precessing torques, or, alternatively, the permanently magnetized end portions of the rotor halves may be so magnetized that they will interact with the torque winding fields to apply precessing torques in assisting directions about the minor gyro axes.

It should thus be apparent that the specific embodiments of this invention disclosed herein are of a descriptive rather than a limiting nature and that various changes, combinations, substitutions, or modifications, may be employed in accordance with these teachings without departing in spirit or scope from this invention in its broader aspects.

What I claim as new and desire to secure by Letters Patent of the United States is:

1. A gyroscopic device comprising two gyro rotor elements, means mounting said rotor elements for rotation about one spin axis in an axially-spaced relationship, and flat plate means intermediate said rotor elements supporting said mounting means for pivotal movement about an axis normal to said spin axis.

2. A gyroscopic device comprising a pair of collinear spaced-apart gyro rotors, and flat plate means extending through the space between said rotors and pivotally supporting said rotors about an axis normal to the axis of spin thereof, said rotors being of like construction and symmetrically disposed about said normal axis.

3. A gyroscopic device comprising a pair of gyro rotors of like dimensions and configurations, means mounting said rotors in a collinear spaced-apart relationship for rotation about a spin axis, and flat plate means of uniform thickness passing between said rotors to support said mounting means and said rotors for pivotal movement about a second axis perpendicular to said spin axis, said flat plate means being symmetrical about said second axis.

4. A gyroscopic device comprising a pair of hollow cup-shaped rotors, flat plate means mounting said rotors for rotation about one spin axis in a closely-spaced axial relationship, said flat plate means being positioned within the cavity formed by said hollow rotors normally in relation to said spin axis and extending outwardly through the space between said rotors, and pivot means on opposite edges of said flat plate means along an axis normal to said spin axis.

5. A gyroscopic device comprising two hollow cup-shaped gyro rotors, means mounting said rotors for rotation about one spin axis in an axially-spaced relationship, said means being substantially surrounded by said hollow rotors, two like annular electrical motor stators arranged colinearly and carried by said mounting means coaxially with said spin axis, two annular electrical motor rotors affixed to each of said gyro rotors surrounding the peripheries of said stators, said stators and rotors being nested substantially within said hollow gyro rotors, and means extending between said gyro rotors and stators and pivotally supporting said mounting means about an axis perpendicular to said spin axis.

6. A gyroscopic device as set forth in claim 5 wherein said stators comprise two annular lamination stacks of like dimensions and each having a stator winding thereabout, each of said stacks and the winding therefor being positioned adjacent said pivotal supporting means on a different side of said pivotal supporting means and said perpendicular axis.

7. A gyroscopic device as set forth in claim 5 wherein said stators comprise two annular lamination stacks of like dimensions and each positioned adjacent said pivotal supporting means on a different side of said pivotal supporting means and said perpendicular axis, and common stator winding means having turns thereof extending across said pivotal supporting means through both of said lamination stacks.

8. A gyroscopic device comprising a pair of gyro rotors, means mounting said rotors for rotation about one spin axis in a close axially-spaced relation, and a flat member of uniform thickness just short of the axial spacing between said rotors positioned between said rotors and pivotally supporting said mounting means about an axis normal to said spin axis.

9. A gyroscopic device comprising a pair of gyro rotors, means mounting said rotors for rotation about one spin axis with a small axial spacing therebetween, and a single integral member extending fully across said rotors in said space between said rotors and normal to said spin axis, and pivotal support means supporting said member, said member constituting the sole support for said mounting means in said pivotal support means.

10. A gyroscopic device comprising a pair of gyro rotors, means mounting said rotors for rotation about one spin axis with a small axial spacing therebetween, a flat member of uniform thickness just short of said spacing positioned between said rotors normal to said spin axis and extending fully across the space between said rotors, said member supporting said mounting means, and trunnions pivotally supporting said member about an axis normal to said spin axis, said member constituting the sole support for said mounting means in said trunnions.

11. A gyroscopic device comprising an outer frame, a main gimbal pivotally mounted in said frame about a major axis, and a rotor structure pivotally mounted in said main gimbal about an axis normal to said major axis, said rotor structure comprising a support plate of uniform thickness extending substantially straight across said gimbal, pivot means mounting said plate in said gimbal about a minor axis normal to said major axis, a pair of gyro rotors, and means supported in said pivot means solely by said plate mounting said rotors on opposite sides of and close to said plate for rotation about a spin axis normal to said major and minor axes.

12. A gyroscopic device as set forth in claim 11 wherein said rotors are substantially cup-shaped and are affixed to a common rotor shaft, and further comprising, electrical motors for each of said rotors having two annular stators mounted coaxially with said shaft in fixed relation to said plate and mounting means on opposite sides of said plate, and two annular hysteresis motor rotors each coupled with a different one of said rotors and shaft for rotation therewith in surrounding relation to one of said annular stators, said stators and motor rotors being nested substantially within said cup-shaped gyro rotors.

13. A gyroscopic device comprising a substantially straight and flat rectangular member having uniform thickness, trunnions supporting said member for pivotal movement about a support axis symmetrical with said member and passing longitudinally through said member, a pair of substantially cup-shaped gyro rotors, bearing means mounting said rotors on said member for rotation on opposite sides of said member about a spin axis normal to said support axis, two annular electrical motor rotors coaxial with said spin axis one on each side of said member and each coupled to rotate one of said gyro rotors, and two annular electrical motor stators coaxial with said spin axis one fixedly mounted on each side of said member and positioned to rotate one of said motor rotors, said motor rotors and stators and said bearing means being nested substantially within the spaces existing between said cup-shaped rotors and said support member.

14. A gyroscopic device as set forth in claim 13 wherein said annular motor stators comprise two annular stator cores fixedly mounted on opposite sides of and adjacent said support member, and a single stator winding arrangement having substantially all the turns thereof linking both of said cores, whereby there are substantially no stator end turns next to said support member.

15. A gyroscopic device comprising an outer frame, a main gimbal pivotally mounted in said frame about a major axis, a pair of gyro rotors, means mounting said rotors for rotation about one spin axis in an axially-spaced relationship, support means extending between said rotors to support said mounting means for pivotal movement about a minor axis normal to both said spin and major axes, and erecting means supported independently of said rotors and mounting and support means and in proximity with at least one of the end portions of said rotors, said erecting means and at least one of said rotor end portions being one of conducting material and the other of material producing a magnetic field, whereby magnetic interaction therebetween precesses said rotors into alignment with said erecting means.

16. A gyroscopic device as set forth in claim 15 wherein said major and minor axes are normally horizontal, wherein said spin axis is normally vertical, and further comprising pendulous support means for said erecting means to cause precession of said rotors which coeces said spin axis into alignment with an average position of said erecting means.

17. A gyroscopic device comprising an outer frame, a main gimbal pivotally mounted in said frame about a normally horizontal major axis, a pair of substantially hemispherical gyro rotor halves, means mounting said rotor halves for rotation about one spin axis with a close coaxial spacing to form a rotor structure having a substantially spherical exterior, and a substantially flat circular support plate of uniform thickness just short of said spacing extending between said rotor halves to support said mounting means and rotor halves in said main gimbal for pivotal movement about a minor axis normal to both said spin and major axes, said plate being of the same diameter as said rotor halves to complete the substantially spherical exterior of said rotor structure.

18. A gyroscopic device comprising an outer frame, a main gimbal pivotally mounted in said frame about a normally horizontal major axis, a pair of substantially hemispherical gyro rotor halves, means mounting said rotor halves for rotation about a spin axis with a small axial spacing therebetween to form a rotor structure having a substantially spherical exterior, indicia on the exteriors of said rotor halves, said indicia being arranged circularly about said rotor halves in planes normal to said spin axis, and substantially flat support means of uniform thickness just short of said spacing extending between said rotor halves to support said mounting means and rotor halves in said main gimbal for pivotal movement about a minor axis normal to both said spin and major axes.

References Cited in the file of this patent

UNITED STATES PATENTS

| | | |
|---|---|---|
| 1,309,636 | Klahn | July 15, 1919 |
| 1,954,998 | Hoffmann | Apr. 17, 1934 |

FOREIGN PATENTS

| | | |
|---|---|---|
| 2,695 of 1906 | Great Britain | July 19, 1906 |
| 251,389 | Great Britain | May 6, 1926 |